United States Patent [19]
Kolovson

[11] Patent Number: 5,951,695
[45] Date of Patent: Sep. 14, 1999

[54] FAST DATABASE FAILOVER

[75] Inventor: Curtis P. Kolovson, Redwood City, Calif.

[73] Assignee: Hewlett-Packard Company, Palo Alto, Calif.

[21] Appl. No.: 08/900,945

[22] Filed: Jul. 25, 1997

[51] Int. Cl.$^6$ .................................................. G06F 13/00
[52] U.S. Cl. .................... 714/16; 714/6; 714/11; 714/13; 714/20
[58] Field of Search ........................ 395/182.14, 182.04, 395/182.09, 182.11, 182.17, 182.18; 711/161, 162; 707/204, 202, 19; 714/6, 11, 13, 20

[56] References Cited

U.S. PATENT DOCUMENTS

| | | | |
|---|---|---|---|
| 4,751,702 | 6/1988 | Beier et al. ................................ | 371/9 |
| 5,051,887 | 9/1991 | Berger et al. .......................... | 711/162 |
| 5,347,653 | 9/1994 | Flynn et al. ............................ | 711/162 |
| 5,423,037 | 6/1995 | Hvasshovd ............................. | 707/202 |
| 5,437,026 | 7/1995 | Borman et al. ........................ | 395/600 |
| 5,455,944 | 10/1995 | Haderle et al. ........................ | 395/600 |
| 5,455,946 | 10/1995 | Mohan et al. ......................... | 711/161 |
| 5,524,205 | 6/1996 | Lomet et al. ...................... | 395/182.14 |
| 5,535,381 | 7/1996 | Kopper .................................. | 711/162 |
| 5,546,536 | 8/1996 | Davis et al. ........................... | 711/162 |
| 5,594,900 | 1/1997 | Cohn et al. ............................ | 702/202 |
| 5,706,470 | 1/1998 | Okada .................................... | 711/161 |
| 5,742,792 | 4/1998 | Yanai et al. ............................ | 711/161 |
| 5,799,323 | 8/1998 | Mosher, Jr. et al. .................. | 707/202 |

*Primary Examiner*—Ly V. Hua

[57] ABSTRACT

A database system facilitates quick failover. The database system includes a primary node, a standby node and a fast interconnect between the primary node and the standby node. The primary node includes a primary buffer pool which stores pages of the database information, and a log storage which receives a log of updates for the pages within the primary buffer pool. When a page is to be updated by a primary node, the primary node sends a copy of a before update image of the page to the standby node. When the primary log writes logs of updates to the log storage, the primary node also forwards the logs of updates to the standby node.

20 Claims, 11 Drawing Sheets

FAST DATABASE FAILOVER

BACKGROUND

The present invention concerns database management systems (DBMS) and pertains particularly to recovery from crashes in DBMSs.

DBMSs have had crash recovery for many years. For background information on architectures and algorithms that support database recovery, see for example, Gray, Jim and Reuter, Andreas, *Transaction Processing: Concepts and Techniques, Morgan Kaufinann Publishers, Inc.,* 1993. While variations on techniques for database recovery exist, for the most part they can broadly be described as being based on write-ahead logging. Write-ahead logging means that database updates are first written to a database log file on a disk storage system before being applied to the database. If the database crashes, the state of the database as of the time of the crash can be recovered by analyzing the database log file and performing both undo recovery and redo recovery. Undo recovery involves rolling back the database updates for all transactions that were in progress but uncommitted at the time of the crash. Redo recovery involves re-applying any database updates for transactions that committed between the time of the last checkpoint and the time of the crash.

Most of the commercial database management systems utilize some form of write-ahead logging and perform conventional disk log-based recovery, as described above. The time required to perform crash recovery depends on several factors, such as the frequency of checkpoints, the size of the buffer pool, and the rate of page updates. The time to perform database recovery can take less than a minute if there was no update activity at the time of the crash and the database storage was in a consistent state at that time. Other than that special case, database recovery time ranges from a small number of minutes to tens of minutes to over an hour, depending on the above-listed factors as well as other factors.

The technique of write-ahead logging and performing conventional disk log-based recovery for a database poses a challenge to DBMS vendors and platform vendors who are striving to reduce the time required to make a database available after a system crash. For example, it is desirable to be able to guarantee less than one-minute end-to-end client transparent database failover. A database failover is a complete recovery from a failure in a database. Further, it is desirable that the end-to-end client transparent database failover be independent of the database workload. In order to do this, techniques other than conventional disk log-based recovery have been considered.

Database failover techniques which attempt to provide fast (i.e., less than one minute) end-to-end client transparent database failover fall into three categories: conventional DBMSs with frequent checkpoints, parallel databases with mutual recovery/takeover, and specialized fast-failover DBMSs based on proprietary hardware and operating systems.

In order to implement a conventional DBMS with frequent checkpoints it is necessary only to run an available database product, such as Oracle 7 available from Oracle Corporation, having a business of 100 Oracle Parkway, Redwood Shores, Calif. 94065, Informix ODS available from Informix Software, Inc., having a business address of 4100 Bohannon Drive, Menlo Park Calif. 94025, or Sybase System 11 available from Sybase, Inc., having a business address of 6475 Christie Avenue, Emoryville, Calif. 94608, with the checkpoint interval set so that checkpoints occur very frequently. The above listed database products are "single-instance" database products, i.e., they run as a single database instance on a single computer node, which may be a uni-processor or a symmetric multi-processor (SMP). While this technique provides a reduction in the time required for crash recovery, it does not provide guaranteed recovery time within a small number of minutes, particularly if there is a high rate of updates. Also, this approach has a substantial impact on runtime performance due to increased disk utilization by a page cleaner daemon. This overhead may be unacceptable for high-throughput database applications.

Parallel databases with mutual recovery/takeover utilize multiple database instances that mutually recovery a failed instance. For example, Oracle Parallel Server (OPS) available from Oracle Corporation implements mutual recovery/takeover utilizing multiple database instances using a shared-disk model. Informix XPS available from Informix Software, Inc., Sybase MPP available from Sybase, Inc., and IBM DB2 Parallel Edition, available from IBM Corporation, having a business address of 650 Harry Road, San Jose, Calif. 95120, implement mutual recovery/takeover utilizing multiple database instances without using a shared-disk. While parallel databases with mutual recovery/takeover have the advantage of providing fast recovery in the sense that the surviving instances will initiate recovery of the failed instance as soon as they are notified of the failure, the recovery is still based on conventional disk-based log recovery, and therefore is still not guaranteed to be completed in a small number of minutes for any database workload.

One example of the use of specialized fast-failover DBMSs based on proprietary hardware and operating systems are systems developed by Tandem Computers, Inc., having a business address of 18922 Forge Way, Cupertino, Calif. 95014, which has developed its own specialized DBMS software and proprietary hardware and operating system to achieve a fast-failover database product. These systems utilize redundant hardware and software components. Fault tolerance is provided by coordinating primary and backup processes on nodes that are connected by a high-speed interconnect. This process-pair technology allows for a fast takeover of database operations by the backup system if the primary should fail.

Although this use of redundant hardware and software components is considered a fault-tolerant system, the problem with this approach is that it is based on proprietary hardware and operating system, and is therefore less competitive from a price/performance perspective. The industry trend is rapidly moving toward building scalable, highly available (HA) DBMS systems from commodity off-the-shelf (COTS) technology. As this trend evolves, the scalability and HA characteristics of these systems may approach that of the proprietary fault-tolerant systems, and at a substantially reduced price. An example of a HA infrastructure is HA cluster products available from Hewlett-Packard Company, having a business address of 3000 Hanover Street, Palo Alto, Calif. 94304. In the HA cluster products available from Hewlett-Packard Company, the HA infrastructure is provided by MC/ServiceGuard high availability clustering system, also available from Hewlett-Packard Company, operating on the HP-UX operating system, available from Hewlett-Packard Company as well.

SUMMARY OF THE INVENTION

In accordance with the preferred embodiment of the present invention, a database system facilitates quick failover. The database system includes a primary node, a standby node and a fast interconnect between the primary node and the standby node. The primary node includes a primary buffer pool which stores pages of the database information, and a log storage which receives a log of updates for the pages within the primary buffer pool.

When a page is to be updated by a primary node, the primary node sends a copy of a before update image (also called before-image) of the page to the standby node. If the page to be updated does not exist in the primary buffer pool, the primary node fetches the page from database storage into the buffer pool. If the page existing in the buffer pool is clean, the primary node sends the copy of the before update image of the page to the standby node. The page is then updated on the primary node.

When the primary log writes logs of updates to the log storage, the primary node also forwards the logs of updates to the standby node. The primary log writes log records, for example, when the page is dirty and is being written back to a database storage and when a transaction which updates the page is in a commit phase.

In the preferred embodiment, the standby buffer includes a standby buffer pool. When the standby node receives the copy of the before update image of the page by the standby node, the standby node discards the before update image of the page when the standby node already is storing in the standby buffer a version of the page which is identical with the before update image of the page. Also, when the standby node already is storing a version of the page in the standby buffer which is not identical with the before update image of the page, the standby node replaces the version of the page which is not identical with the before update image of the page. When the standby node is not currently storing any version of the page, the standby node stores the before update image of the page in the standby buffer.

In the preferred embodiment, the standby node also includes a log record reception buffer. The log record reception buffer receives the logs of updates forwarded to the standby node by the primary node. The standby node performs redo recovery on pages within the standby buffer pool based on the logs of updates received by the log record reception buffer.

Also in the preferred embodiment, the standby node includes an active transaction cache table. Entries within the active transaction cache table include an indication of a transaction which updates a page in the standby buffer pool and a pointer into the log storage for the transaction. The standby node deletes a first entry from the active transaction cache table upon the standby node receiving a commit transaction record for a first transaction indicated by the entry.

Also in the preferred embodiment, upon the standby node receiving a rollback record for a first transaction, the standby node deletes from the active transaction cache table a first entry which includes an indication of the first transaction. Additionally, the standby node performs an undo recovery on any pages which are modified by the first transaction.

Upon failure of the primary node, the standby node activates connections between the standby node and the log storage and between the standby node and database storage. The standby node also performs undo recovery on pages within the standby buffer pool to rollback updates made by transactions that were left active upon the failure of the primary node. The standby node also initiates a database checkpoint in order to flush dirty pages within the standby buffer pool to the database storage. Further, upon failure of the primary node, the standby node additionally attempts to initiate contact with a new standby node.

The present invention guarantees fast database failover, independent of the database workload (including checkpoint frequency and update rate), without imposing a significant performance overhead. This is done because use of the present invention obviates the need for conventional disk log-based recovery after a system crash by utilizing a standby node that is ready to takeover for a failed primary node. This technique can be implemented through extensions to DBMSs on an open systems platform that has a high speed interconnect and a HA infrastructure.

DESCRIPTION OF THE PREFERRED EMBODIMENT

Figure 1:
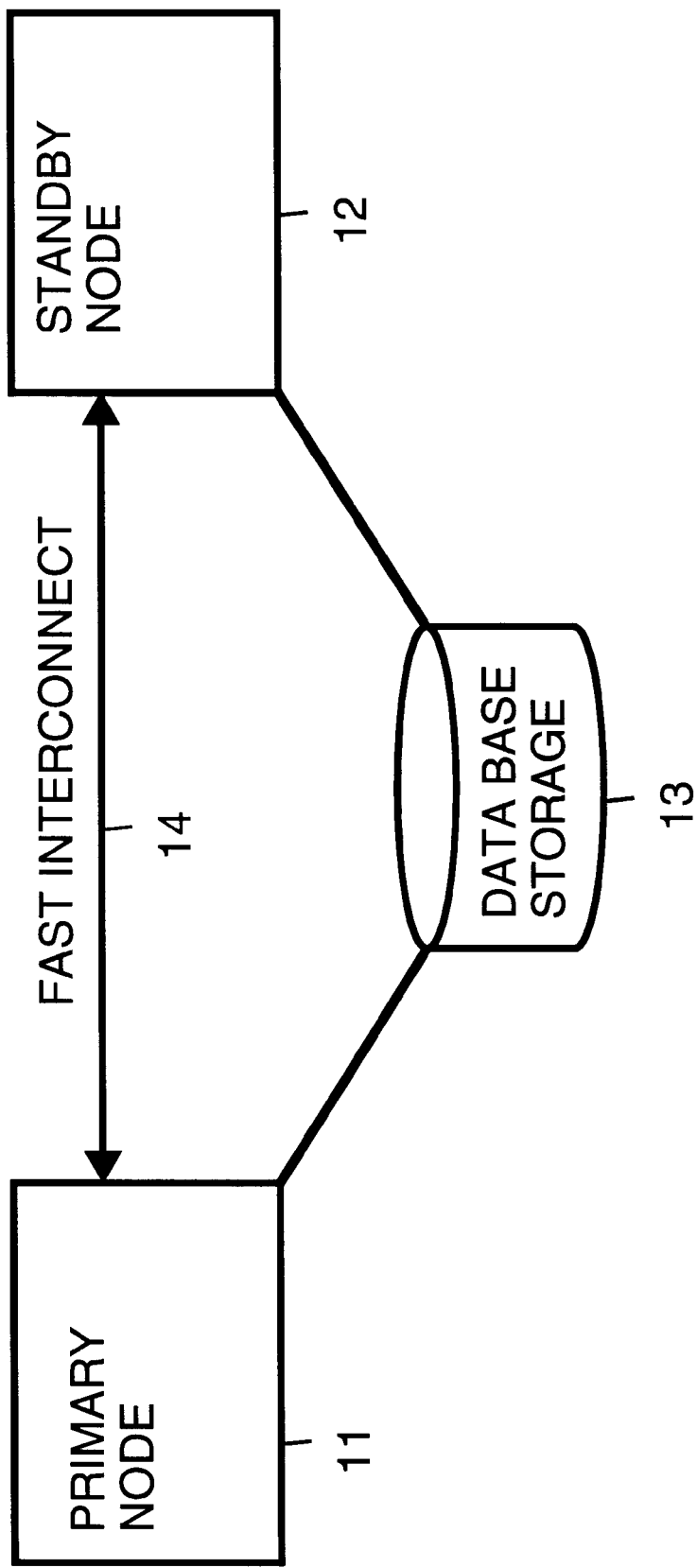
FIG. 1 is a simplified block diagram of an architecture which supports fast database failover in accordance with a preferred embodiment of the present invention.

FIG. 1 is a simplified block diagram of an architecture which supports fast database failover. A primary node 11 and a standby node 12 are connected by a fast interconnect 14. For example, fast interconnect 14 is implemented in accordance with the FibreChannel interconnect standard. Primary node 11 and standby node 12 are each connected to database storage 13 which is, for example, a disk storage system implemented by a set of disks or Redundant Array of Independent Disks (RAID) devices.

In the preferred embodiment, at a given time only one node—either primary node 11 or standby node 12, but not both nodes at the same time—has exclusive access to database storage 13. As further described below, standby node 12 maintains the current state of dirty pages in its buffer pool and keeps a cache of log records for all in-progress transactions. If primary node 11 fails, standby node 12 does undo recovery, then becomes the new primary node and resumes operations with the current (and committed) dirty pages in its buffer pool.

Figure 2:
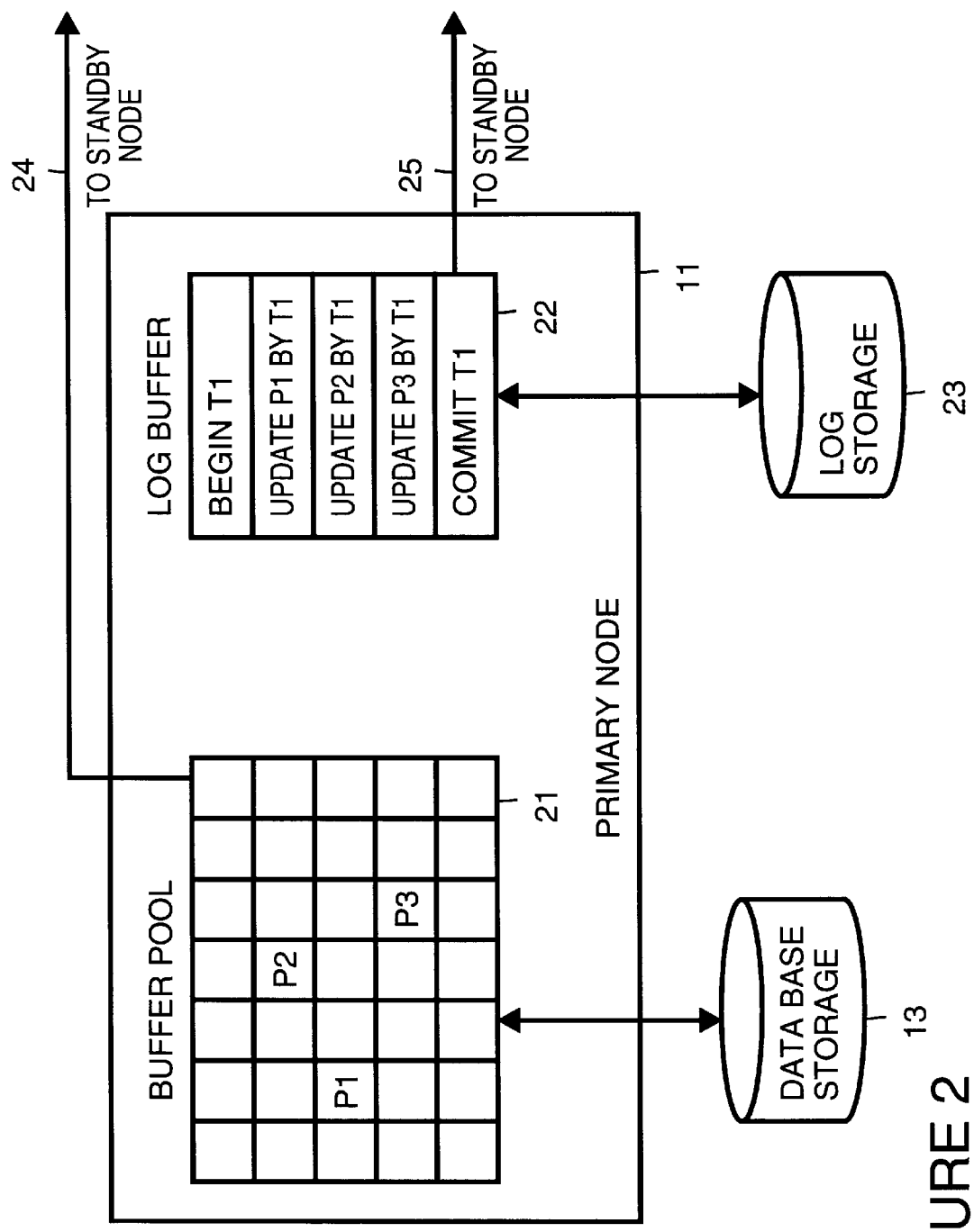
FIG. 2 is a simplified block diagram which shows memory organization within a primary node within an architecture which supports fast database failover in accordance with a preferred embodiment of the present invention.

FIG. 2 shows memory organization within primary node 11. Pages to be modified by primary node 11 are read into a buffer pool 21. For example, pages P1, P2 and P3 are shown within buffer pool 21. A log buffer 22 logs updates to pages stored in buffer pool 21 during transactions. For example, In FIG. 1, log buffer 22 is shown to contain entries detailing how pages P1, P2 and P3 are updated during a transaction T1.

Primary node 11 sends before-images (the unmodified contents) of pages in buffer pool 21 that are about to be updated, once per update cycle to standby node 12. This is illustrated by an arrow 24. An update cycle for a page begins when the page is first updated and ends when the page is cleaned (written back to database storage 13). Primary node 11 also sends Log records from log buffer 22 to standby node 12. This is illustrated by an Arrow 25. Primary node 11 does not clean a dirty page within buffer pool 21 Until primary node 11 stores the log records associated with the dirty page into log storage 23, forces the propagation of those log records to standby node 12 and forces the before-images of the to-be-modified pages to standby node 12 (if these pages are not already in the buffer pool of standby node 12). This is a write and propagate-ahead protocol. It is assumed that messages from primary node 11 to standby node 12 are reliable. For example, standby node 12 acknowledges receipt of messages from primary node 11 and primary node 11 does not consider a message delivered until primary node 11 receives an acknowledgment from standby node 12.

Primary node 11 forces log writes (log force) in two situations. The first situation is at transaction commit time. The commit record and all log records containing updates associated with the committing transaction must be forced to log storage 23 before the transaction may return successful completion status. The second situation is before a modified page can be written back to database storage 13. In this case the update records associated with the modifications to that image must be forced to log storage 23. The log writes must be forced both to log storage 23 as well as sent to standby node 12. For example, log storage 23 is implemented using one or more disk storage devices.

Primary node 11 periodically sends standby node 12 a list of pages that have been cleaned so standby node 12 can reclaim buffers. Standby node 12 always reclaims dirty page buffers at checkpoints. When standby node 12 sees commits/rollbacks in the log stream (and after it has done redo processing on the associated pages in its buffer pool), standby node 12 reclaims space in its active transaction cache table. For the example shown in FIG. 2, transaction T1 modified pages P1, P2 and P3. When transaction T1 commits, primary node 11 forces its log of transaction T1 to log storage 23 and to standby node 12. As illustrated in FIG. 2, the log of transaction T1 includes the begin transaction (Shown in FIG. 2 as "begin T1"), the updates of P1, P2 and P3 by T1, and the commit record for T1 (Shown in FIG. 2 as "commit T1"). After these log records have been forced to log storage 23 and standby node 12, the transaction can be allowed to return a successful completion status to the user. Also, the updates to pages P1, P2 and P3 cannot be written back to database storage 13 until their associated update records have been forced to log storage 23 and standby node 12.

Figure 3:
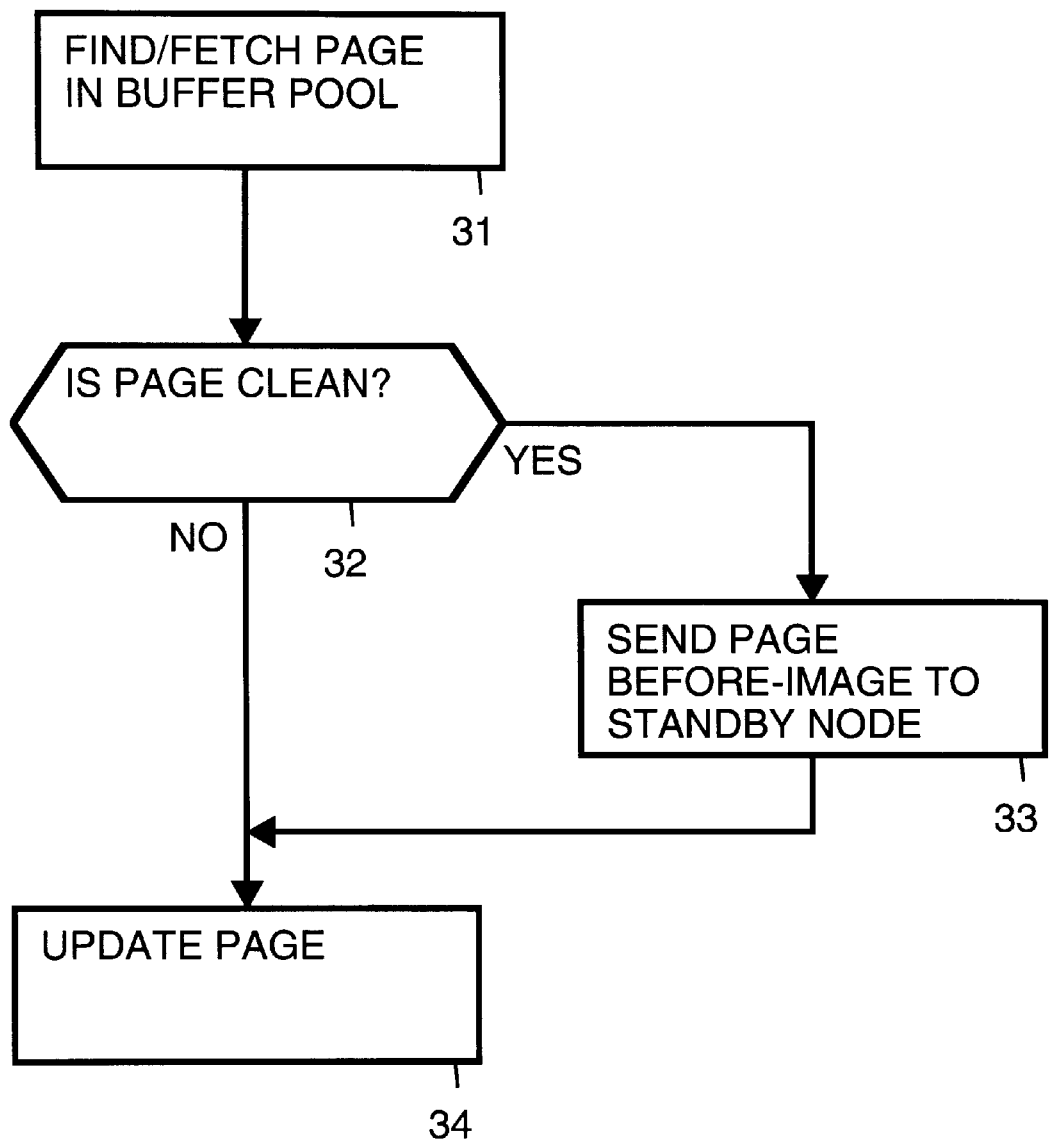
FIG. 3, FIG. 4 and FIG. 5 are flowcharts which illustrate operations within the primary node shown in FIG. 2 in accordance with a preferred embodiment of the present invention.

FIG. 3 is a flowchart which illustrates update page operation of primary node 11. In a step 31, the page to be updated is found in buffer pool 21 of primary node 1. If the page to be updated is not in buffer pool 21, the page is fetched from database storage 13 into buffer pool 21.

In a step 32, a determination is made as to whether the page is clean. A page is clean when the version of the page in buffer pool 21 is the same as the version of the page stored in database storage 13. If the page is clean, in a step 33, a before-image of the page is sent to standby node 12. In a step 34, 20 the page is updated.

Figure 4:
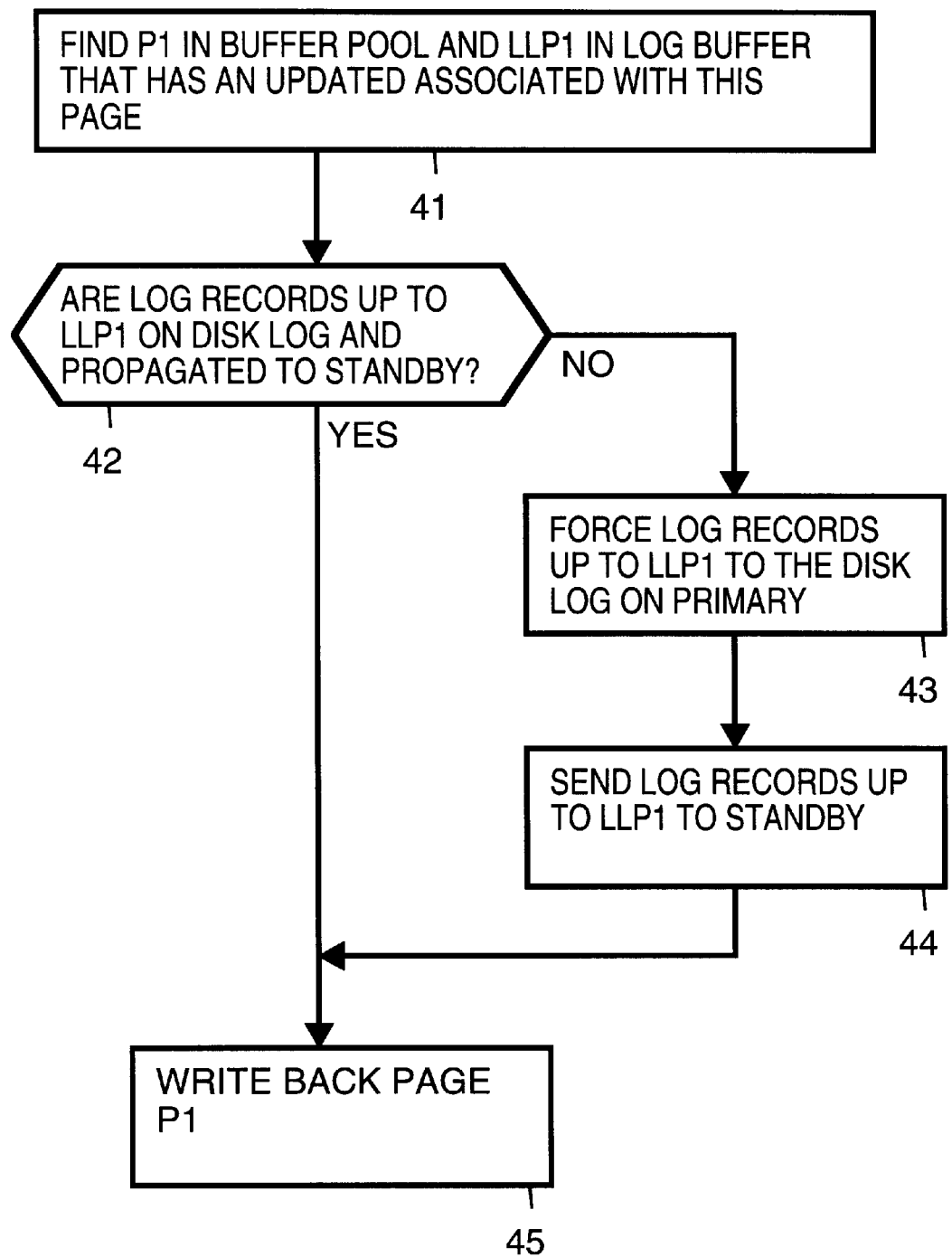

FIG. 4 is a flowchart which illustrates a page clean operation performed by primary node 11. In a step 41, a dirty page (e.g., page P1) is found along with a latest log (LLP1) for the dirty page in log buffer 22 thathas an update associated with the dirty page.

In a step 42, a determination is made as to whether the log records in log buffer 22 up to and including LLP1 have been stored to log storage 23 and propagated to standby node 12. If not, in a step 43, the log records in log buffer 22 up to and including LLP1 are stored to log storage 23. In a step 44, the log records in log buffer 22 up to and including LLP1 are sent to standby node 12. In a step 45, once the log records in log buffer 22 up to and including LLP1 have been stored to log storage 23 and propagated to standby node 12, the page clean is completed by writing page P1 back to database storage 13.

Figure 5:
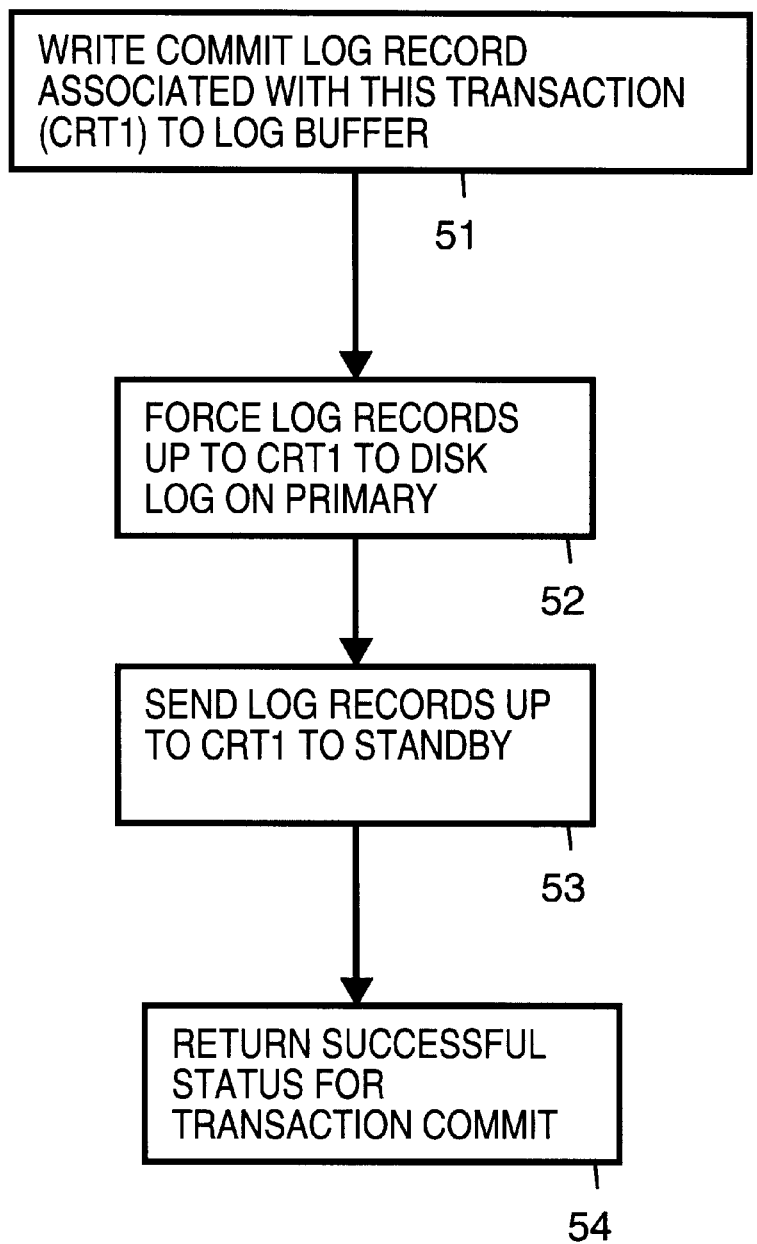

FIG. 5 is a flowchart which illustrates a commit operation (e.g., commit transaction T1) performed by primary node 11. In a step 51, a commit log record (CRT1) associated with transaction T1 is written to log buffer 22.

In a step 52, the log records in log buffer 22 up to and including CRT1 are stored to log storage 23. In a step 53, the log records in log buffer 22 up to and including CRT1 are sent to standby node 12. In a step 54, once the log records in log buffer 22 up to and including CRT1 have been stored to log storage 23 and propagated to standby node 12, a successful status for the transaction commit is returned.

Figure 6:
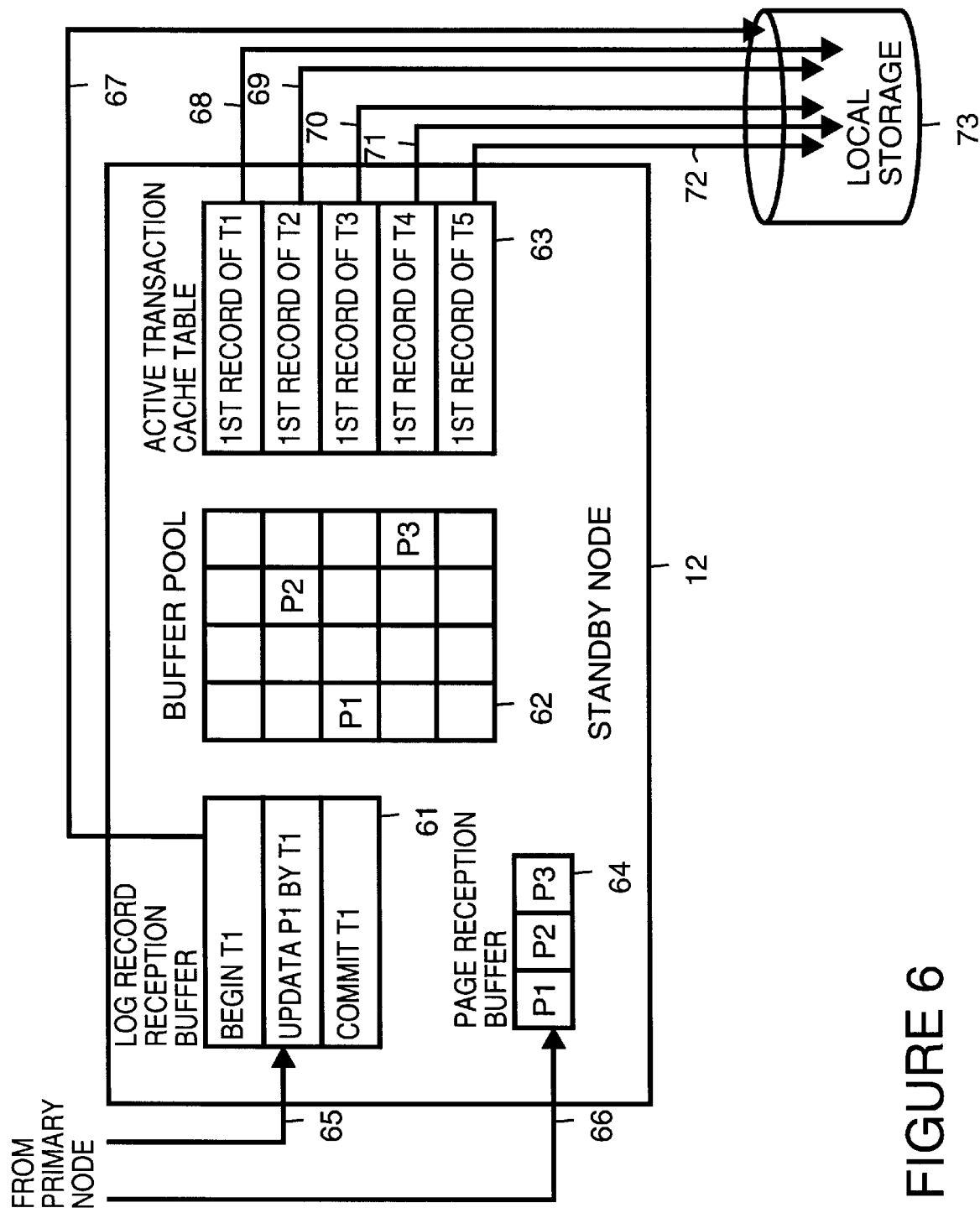
FIG. 6 is a simplified block diagram which shows memory organization within a standby node within an architecture which supports fast database failover in accordance with a preferred embodiment of the present invention.

FIG. 6 shows the architecture of standby node 12. Standby node 12 maintains the current state of dirty pages in a buffer pool 62. During normal operations, standby node 12 performs redo recovery on the pages in buffer pool 62 by applying changes recorded in the log stream to the pages in buffer pool 62. The before-images (unmodified pages) on which to perform redo recovery are sent by primary node 11 to standby node 12. Standby node 12 receives the before-images of each page in a page reception buffer 64. This is represented by an arrow 66. For each page standby node 12 receives in page reception buffer 64, standby node 12 checks to see if a copy of the page already exists in buffer pool 62. If so, standby node 12 checks the copy in buffer pool 62 to see whether the copy is the same version as the newly received before-image of the page. If so, standby node 12 can discard the newly received before-image of the page. If not, standby node 12 replaces the copy of the page currently in buffer pool 64 with the newly received before-image of the page. If standby node 12 does not find a copy of the page in buffer pool 62, standby node 12 adds the newly received before-image of the page to buffer pool 64.

Standby node 12 receives the log record stream from primary node 11 into a log record reception buffer 61. This is represented by an arrow 65. After standby node 12 receives the log record stream from primary node 11 into log record reception buffer 61, standby node 12 applies the updates indicated in those log records to the pages in buffer pool 62, and then writes out the log records to one of a pool of local log files (also called log spool) on local storage 73, as represented by a line 67. Local storage 73 is implemented, for example, using one or more disk storage devices. The log files on local storage 73 are used to store the log records until they are no longer needed. The log records are no longer needed when their associated transactions have been completed.

The log files within the log spool on local storage 73 are reused in a circular fashion. That is, when the first log file of the log spool on local storage 73 is full, writes are then directed to a second log file of the log spool on local storage 73. And so on until the last file in the pool of log files for the log spool on local storage 73 is full. At this point, writes are redirected to the first available log file of the log spool on local storage 73.

A log file on local storage 73 is no longer needed and can be reused when all of the transactions associated with its log records have completed (either committed or aborted), which is the case if there are no references to it from an active transaction cache table 63.

The process of finding an available log file is performed by checking, before opening a log file, whether there are any references to records in that log file from active transaction cache table 63. If there are not, that log file can be opened. Otherwise another log file must be found that has no references to it from active transaction cache table 63.

Standby node 12 also keeps track of active transactions so that, in the event of a failover, standby node 12 knows which transactions were in progress at the time of the failure of primary node 11. This allows standby node 12 to be able to perform undo recovery on the pages in buffer pool 62 to rollback the affects of the transactions that were in progress but uncommitted at the time of the failure of primary node 11. The active transactions are stored in active transaction cache 63 located in the memory of standby node 13 and are stored in a local storage 73. The active transactions are stored as log records associated with the active transactions. Active transaction cache table 63 on standby node 12 contains entries for each active transaction. Each entry contains a <log file, offset in file>descriptor which points to the start of the transaction's log records in a log file within local storage 73. This is represented in FIG. 6 by arrows 68, 69, 70, 71 and 72. The purpose of this active transaction cache table 63 is to provide standby node 12 with fast access to the log records of the uncommitted transactions within the log spool stored in local storage 73. This allows standby node 12 to quickly perform undo recovery at failover time.

At failover time, standby node 12 checks the end of log buffer 22 stored in log storage 23 of primary node 11 for (possibly) missing log records, i.e., for log records that were written to log storage 23 but didn't get propagated to standby 12 before the crash. Other than this check, standby node 12 does not read log storage 23 at failover time. In the case of a double failure (failure of both primary node 11 and standby node 12), either primary node 11 or standby node 12 can recover the database using conventional disk log-based recovery.

Figure 7:
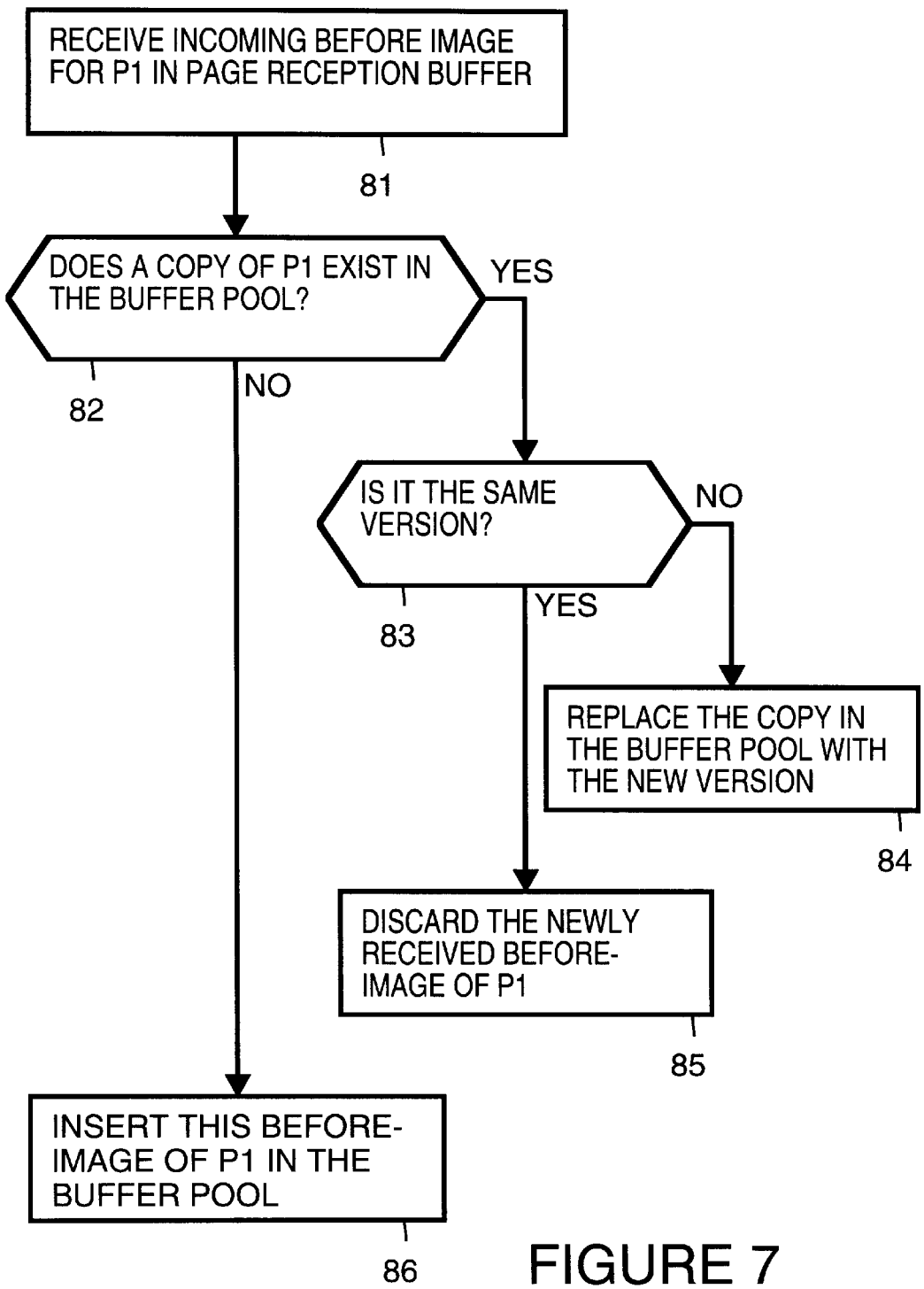
FIG. 7, FIG. 8, FIG. 9, FIG. 10 and FIG. 11 are flowcharts which illustrate operations within the standby node shown in FIG. 6 in accordance with a preferred embodiment of the present invention.

FIG. 7 is a flowchart which shows how standby node 12 processes a before-image of a page P1 received from primary node 11. In a step 81, standby node 12 receives a before-image of page P1 into page reception buffer 64. In a step 82, standby node 12 makes a determination as to whether a copy of page P1 exists in buffer pool 62. If in step 82 standby node 12 makes the determination that a copy of page P1 does not exist in buffer pool 62, in a step 86 the before-image of page P1 is inserted into buffer pool 62.

If in step 82 standby node 12 makes the determination that a copy of page P1 does exist in buffer pool 62, in a step 83 standby node 12 makes a determination as to whether the copy of page P1 in buffer pool 62 is the same as the before-image of page P1 received from primary node 11. If in step 83 standby node 12 makes the determination that the copy of page P1 in buffer pool 62 is the same as the before-image of page P1 received from primary node 11, in a step 85, standby node 12 discards the before-image of page P1 received from primary node 11. If in step 83 standby node 12 makes the determination that the copy of page P1 in buffer pool 62 is not the same as the before-image of page P1 received from primary node 11, in a step 84, standby node 12 replaces the copy of page P1 currently residing in buffer pool 62 with the before-image of page P1 received from primary node 11.

Figure 8:
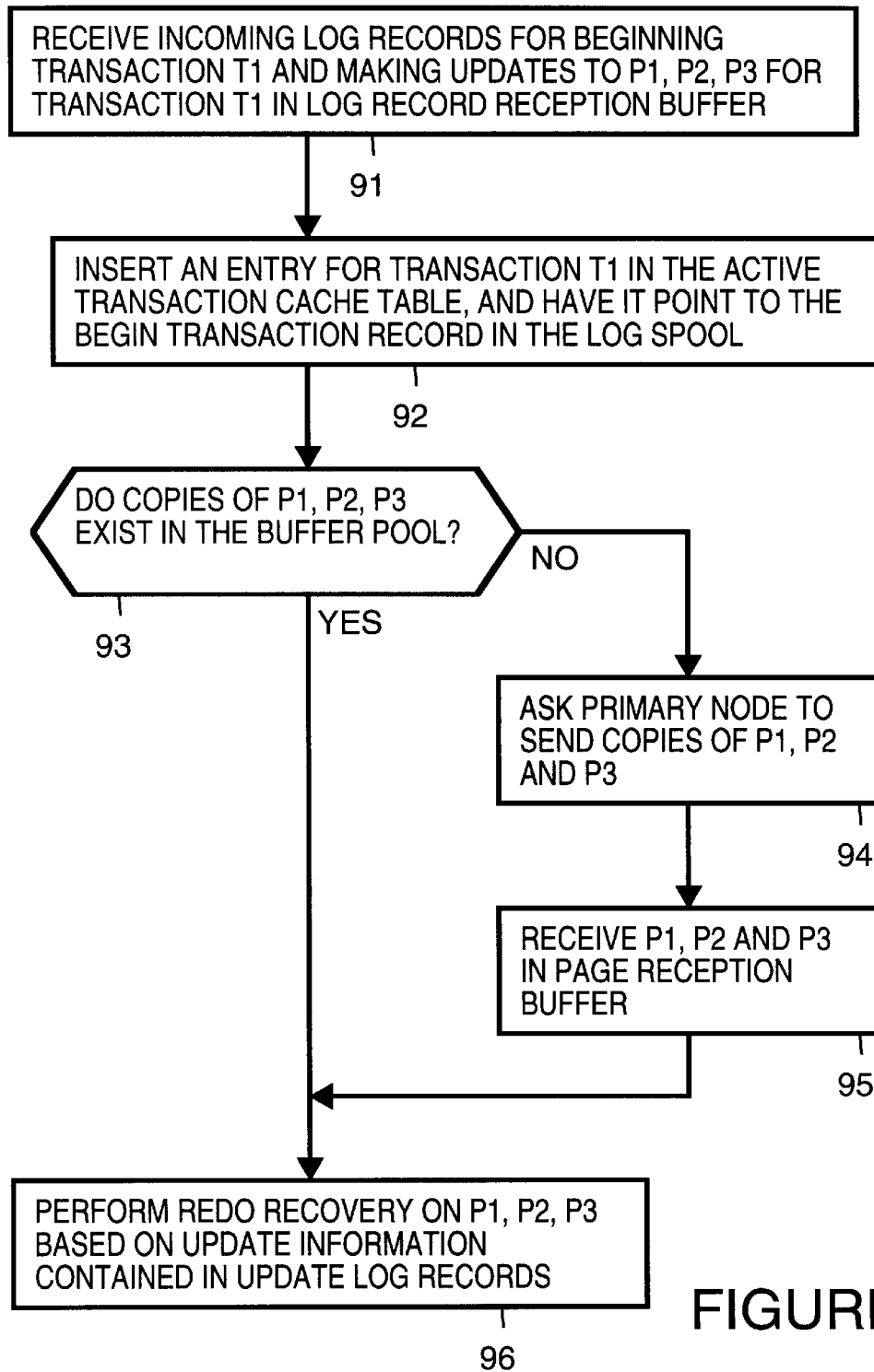

FIG. 8 is a flowchart which shows how standby node 12 processes incoming log records for a transaction T1 which modified pages P1, P2 and P3. In a step 91, standby node 12 receives from primary node 11 incoming log records for beginning transaction T1 and for making updates to P1, P2 and P3 for transaction T1. The incoming log records are received into log record reception buffer 61. A log record for beginning transaction T1 is also stored in the log spool within local storage 73.

In a step 92, an entry for transaction T1 is inserted in active transaction table 63. The entry includes a pointer to the begin transaction T1 record stored in the log spool within local storage 73.

In a step 93, standby node 12 determines whether copies of page P1, P2 and P3 exist in buffer pool 62. If in step 93 standby node 12 determines that copies of page P1, P2 and P3 do not exist in buffer pool 62, in a step 94 standby node 12 asks primary node 11 to send copies of pages P1, P2 and P3. In a step 95, standby node 12 receives copies of pages P1, P2 and P3 from primary node 11. The copies of pages P1, P2 and P3 are placed in page reception buffer 64. These pages are processed as set out in flowchart shown in FIG. 7.

In a step 96, once standby node 12 recognizes that pages P1, P2 and P3 exist in buffer pool 62, standby 12 performs redo recovery on pages P1, P2 and P3 based on update information contained in log record reception buffer 61. This is done by applying changes recorded in the log stream stored in log record reception buffer 61 to pages P1, P2 and P3 stored in buffer pool 62.

Figure 9:
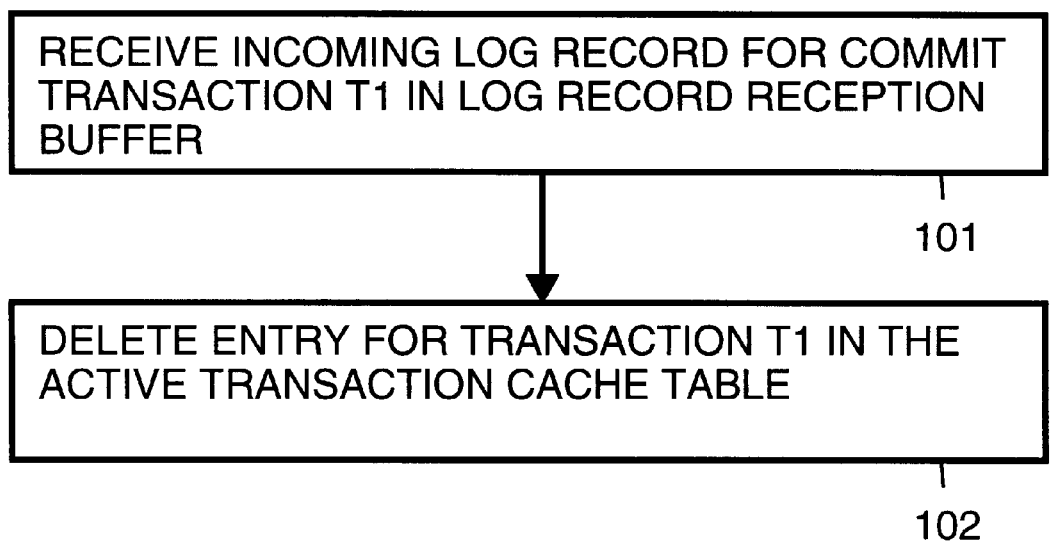

FIG. 9 is a flowchart which illustrates how standby node 12 processes a transaction T1 commit record in the log stream received from primary node 11. In a step 101, standby node 12 receives an incoming log record for commit transaction into log record reception buffer 61. In a step 102, standby node 12 deletes the entry for transaction T1 in active transaction cache table 63.

Figure 10:
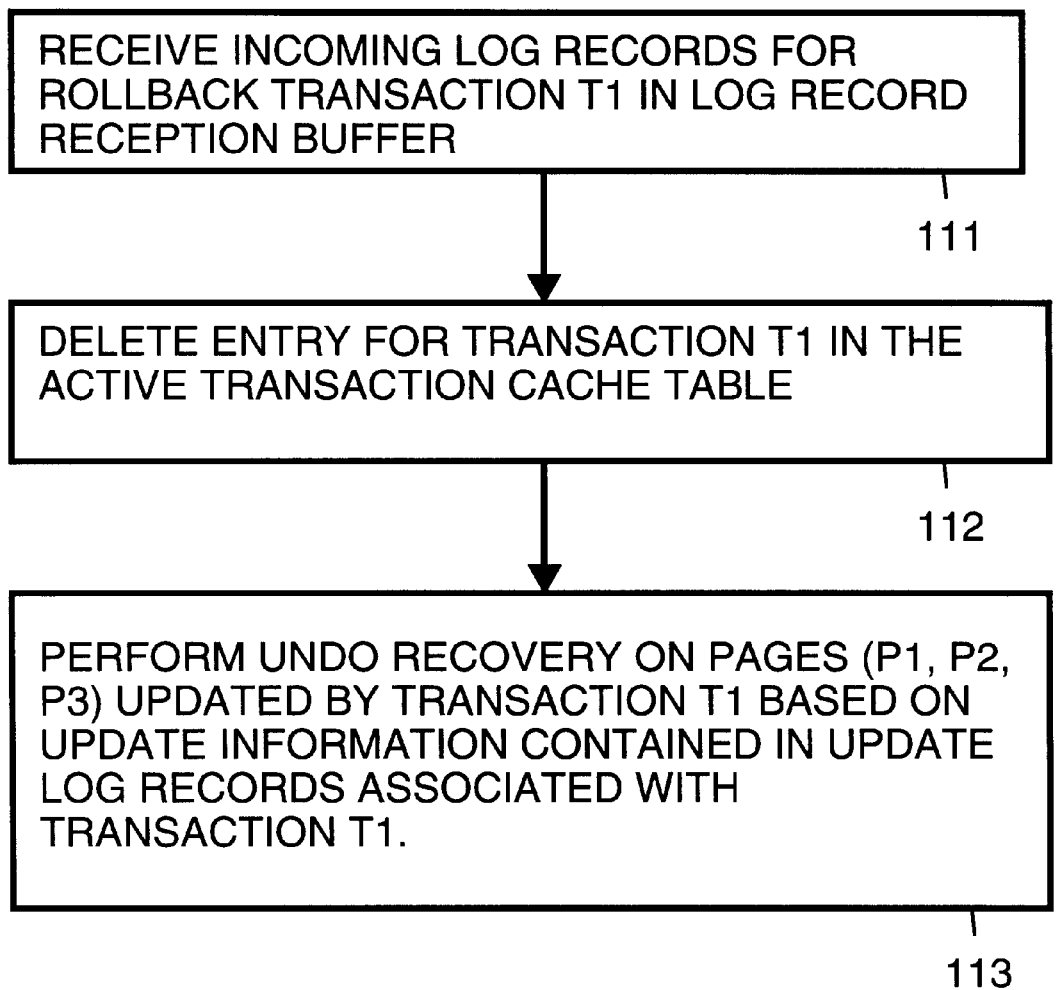

FIG. 10 is flowchart which shows how standby node 12 processes a transaction rollback records in the log stream. In the example shown in FIG. 10, standby node 12 processes a rollback transaction record for transaction T1 which had updated pages P1, P2 and P3.

In a step 111, standby node 12 receives an incoming log record for rollback of transaction T1. Standby node 12 places the incoming log record into log record reception buffer 65.

In a step 112, standby node 12 deletes from active transaction table 63 the entry for transaction T1. In a step 113, standby node 112 performs undo recovery on pages (P1, P2 and P3) updated by transaction T1. The undo recovery is based on update information contained in update log records in local storage 73 associated with transaction T1.

Figure 11:
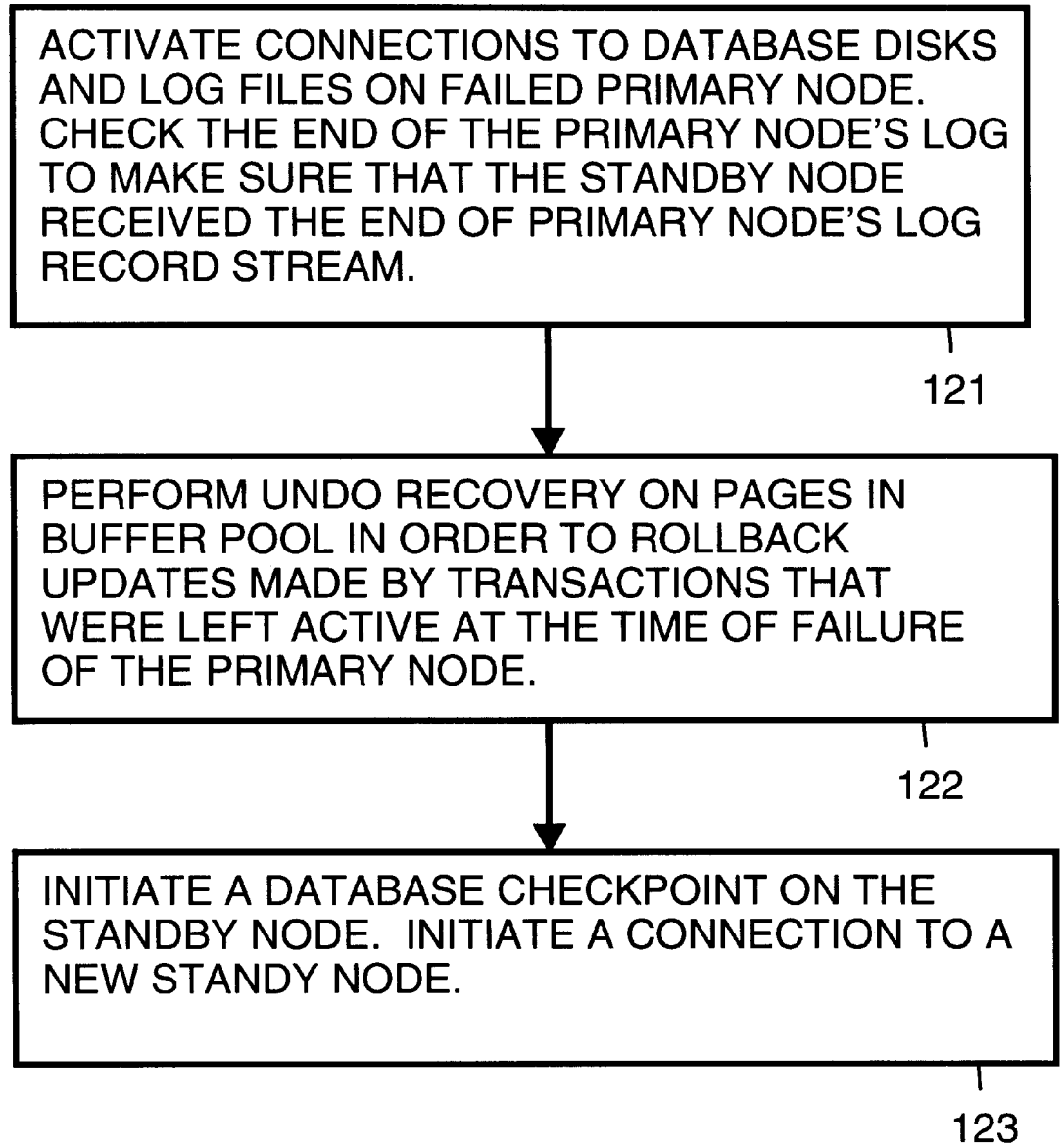

FIG. 11 is a flowchart which illustrates what standby node 12 does at the time primary node 11 fails. In a step 121, standby node 12 activates connections to database storage 13 and to log storage 23. Standby node 12 checks the end of the log on log storage 23 to make sure that standby node 12 received the end of the log record stream to primary node 12.

In a step 122, standby node 12 performs undo recover on pages in buffer pool 62 in order to rollback updates made by transactions that were left active at the time of failure of primary node 12. In a step 122, standby node 12 initiates a database checkpoint on standby node 12. Standby node 12 (now the new primary node) also initiates a connection to the old primary node, if available, or a new standby node.

If standby node 12 fails but primary node 11 is operating normally, primary node 11 is notified that standby node 12 has failed, and takes the following actions. First, primary node 11 reverts to "standard" mode, which means that primary node 11 will perform conventional disk log-based recovery in the event that primary node 11 should fail while standby node 12 is unavailable. Then, primary node 11 attempts to reconnect to the standby node 12 or else to locate another available standby node. Once a connection has been established to a standby node 12 or another standby node, primary node 11 and the connected standby go through a re-synchronization process which occurs after the first checkpoint taken by primary node 11 following the connection to the new standby node. After the checkpoint for primary node 11 completes, primary node 11 immediately reverts back to "fast failover" mode, which means that in the event of a primary failure the standby node will take over for the failed primary node 11. In this mode, primary node 11 again begins sending before-images and log records to the standby node 12.

If primary node 11 fails and standby node 12 (now the new primary node) cannot find a new standby node, standby node 12 operates as the primary node in "standard" mode.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for facilitating failover within a database system comprising the following steps:
   (a) when during normal operation of a primary node, a page is to be updated by the primary node, sending a copy of a before update image of the page to a standby node;
   (b) writing a log of updates for the page to a log storage; and,
   (c) forwarding the log of updates for the page to the standby node.

2. A method as in claim 1 wherein step (a) includes the following substeps:
   (a.1) if the page does not exist in a buffer pool within the primary node, fetching the page from database storage into the buffer pool;
   (a.2) if the page existing in the buffer pool is clean, sending the copy of the before update image of the page to the standby node; and,
   (a.3) updating the page on the primary node.

3. A method as in claim 1 wherein step (b) and step (c) are performed when the page is dirty and is being written back to a database storage.

4. A method as in claim 1 wherein step (b) and step (c) are performed when a transaction which updates the page is in a commit phase.

5. A method as in claim 1 additionally comprising the following steps performed after step (a):
   (d) receiving the copy of the before update image of the page by the standby node;
   (e) discarding the before update image of the page, by the standby node, when the standby node already is storing a version of the page which is identical with the before update image of the page;
   (f) when the standby node already is storing a version of the page which is not identical with the before update image of the page, replacing, by the standby node, the version of the page which is not identical with the before update image of the page; and,
   (g) when the standby node is not currently storing any version of the page, storing, by the standby node, the before update image of the page.

6. A method as in claim 1 additionally comprising the following steps performed after step (c):
   (d) receiving, by the standby node, the log of updates for the page;
   (e) when a copy of the page does not reside in a buffer pool within the standby node, obtaining the page and placing the page into the buffer pool within the standby node; and,
   (f) performing, by the standby node, redo recovery on the page based on the log of updates for the page.

7. A method as in claim 6 additionally comprising the following step performed after step (d):
   (g) inserting an entry into an active transaction cache table within the standby node, the entry indicating a transaction which updates the page and a pointer into a log spool for the standby node.

8. A method as in claim 7 additionally comprising the following step:
   (h) upon the standby node receiving a commit transaction record for the transaction, deleting the entry for the transaction in the active transaction cache table.

9. A method as in claim 7 additionally comprising the following step:
   (h) upon the standby node receiving a rollback record for the transaction, performing the following substeps by the standby node:
      (h.1) deleting the entry for the transaction in the active transaction cache table; and,
      (h.2) performing undo recovery on the page based on the log of updates for the page.

10. A method as in claim 1 additionally comprising the following step:
    (d) upon failure of the primary node, performing the following substeps:
       (d.1) activating connections between the standby node and the log storage and between the standby node and database storage,
       (d.2) performing undo recovery on pages within a buffer pool within the standby node to rollback updates made by transactions that were left active upon the failure of the primary node, and
       (d.3) initiating a database checkpoint on the standby node in order to flush dirty pages within the buffer pool to the database storage.

11. A method as in claim 10 wherein step (d) additionally comprises the following substep:
    (d.4) attempting, by the standby node, to initiate contact with a new standby node.

12. A database system comprising:
    a database storage which stores database information;
    a primary node, comprising:
       a primary buffer pool which stores pages of the database information, and
       a log storage for receiving a log of updates for the pages within the primary buffer pool; and,
    a standby node;
    wherein when during normal operation of the primary node a page is to be updated by the primary node, the primary node sends a copy of a before update image of the page to the standby node, and wherein when the primary writes logs of updates to the log storage, the primary node also forwards the logs of updates to the standby node.

13. A database system as in claim 12 wherein when the page to be updated does not exist in the primary buffer pool, the primary node fetches the page from database storage into the buffer pool.

14. A database system as in claim 12 wherein the standby node comprises:
   a standby buffer pool, wherein when the standby node receives the copy of the before update image of the page by the standby node:
      the standby node discards the before update image of the page when the standby node already is storing in the standby buffer a version of the page which is identical with the before update image of the page,
      when the standby node already is storing a version of the page in the standby buffer which is not identical with the before update image of the page, the standby node replaces the version of the page which is not identical with the before update image of the page, and
      when the standby node is not currently storing any version of the page, the standby node stores the before update image of the page in the standby buffer.

15. A database system as in claim 12 wherein the standby node comprises:
   a standby buffer pool; and,
   a log record reception buffer for receiving the logs of updates forwarded to the standby node by the primary node, wherein the standby node performs redo recovery on pages within the standby buffer pool based on the logs of updates received by the log record reception buffer.

16. A database system as in claim 15 additionally comprising:
   a first connection between the standby node and the database storage; and,
   a second connection between the standby node and the log storage within the primary node;
   wherein upon failure of the primary node,
      the standby node activates the first connection and the second connection,
      the standby node performs undo recovery on pages within the standby buffer pool to rollback updates made by transactions that were left active upon the failure of the primary node, and
      the standby node initiates a database checkpoint in order to flush dirty pages within the standby buffer pool to the database storage.

17. A database system as in claim 16 wherein upon failure of the primary node, the standby node additionally attempts to initiate contact with a new standby node.

18. A database system as in claim 12 wherein the standby node comprises:
   a standby buffer pool;
   a log storage into which are stored the logs of updates forwarded to the standby node by the primary node; and,
   an active transaction cache table, entries within the active transaction cache table including
      an indication of a transaction which updates a page in the standby buffer pool, and
      a pointer into the log storage for the transaction.

19. A database system as in claim 18 wherein the standby node deletes a first entry from the active transaction cache table upon the standby node receiving a commit transaction record for a first transaction indicated by the entry.

20. A database system as in claim 18 wherein upon the standby node receiving a rollback record for a first transaction, the standby node deletes from the active transaction cache table a first entry which includes an indication of the first transaction, and the standby node performs an undo recovery on any pages which are modified by the first transaction.

* * * * *

UNITED STATES PATENT AND TRADEMARK OFFICE
CERTIFICATE OF CORRECTION

PATENT NO. : 5,951,695
DATED : September 14, 1999
INVENTOR(S) : Curtis P. Kolovson It is certified that error appears in the above-identified patent and that said Letters Patent is hereby corrected as shown below:

Column 5,
Line 38, after "table" begin a new paragraph

Column 11,
Line 2, after "primary" insert therefor -- node --

Signed and Sealed this

Twenty-third Day of July, 2002

Attest:

JAMES E. ROGAN
Attesting Officer      Director of the United States Patent and Trademark Office